US012723564B2

(12) United States Patent
Yamada et al.

(10) Patent No.: US 12,723,564 B2
(45) Date of Patent: Sep. 1, 2026

(54) CONTROL APPARATUS FOR INTERNAL COMBUSTION ENGINE

(71) Applicant: Honda Motor Co., Ltd., Tokyo (JP)

(72) Inventors: Yuki Yamada, Tokyo (JP); Koichi Yoshioka, Tokyo (JP); Hirofumi Niiyama, Tokyo (JP); Kazushi Kuranoo, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 2 days.

(21) Appl. No.: 19/053,828

(22) Filed: Feb. 14, 2025

(65) Prior Publication Data

US 2025/0283444 A1 Sep. 11, 2025

(30) Foreign Application Priority Data

Mar. 6, 2024 (JP) ................................ 2024-033555

(51) Int. Cl.
*F02P 5/152* (2006.01)

(52) U.S. Cl.
CPC .................................. *F02P 5/152* (2013.01)

(58) Field of Classification Search
CPC ...................................................... F02P 5/152
See application file for complete search history.

(56) References Cited

U.S. PATENT DOCUMENTS

2002/0139111 A1* 10/2002 Ueda ...................... F02M 25/00 123/3
2005/0056264 A1* 3/2005 Weissman ........... F02D 19/0636 123/577
2014/0060490 A1* 3/2014 Iwai .................... F02D 41/3836 123/478
2021/0231092 A1* 7/2021 Hashimoto ........... F02P 5/1527

FOREIGN PATENT DOCUMENTS

JP 2016173081 A 9/2016

* cited by examiner

*Primary Examiner* — Kevin A Lathers
(74) *Attorney, Agent, or Firm* — Duft & Bornsen, PC

(57) ABSTRACT

Control apparatus for spark ignition type of internal combustion engine, includes: sensor detecting rotation speed and load of engine; and ECU controlling ignition timing of engine based on rotation speed and load and characteristic of reference ignition timing. ECU: calculates first retard amount by multiplying difference between octane number of fuel currently supplied to engine and reference octane number by predetermined retard amount; compensates knock ignition timing to be retarded by first retard amount; and calculates second retard amount based on predetermined retard amount and compensates reference ignition timing to be retarded by second retard amount when operation region of engine defined by rotation speed and load becomes either one of predetermined load region higher in load than optimum operation line in which net fuel consumption rate of engine is highest or maximum output region in which output of engine is maximized.

5 Claims, 6 Drawing Sheets

CONTROL APPARATUS FOR INTERNAL COMBUSTION ENGINE

CROSS-REFERENCE TO RELATED APPLICATION

This application is based upon and claims the benefit of priority from Japanese Patent Application No. 2024-033555 filed on Mar. 6, 2024, the content of which is incorporated herein by reference.

BACKGROUND OF THE INVENTION

Field of the Invention

The present invention relates to a control apparatus for an internal combustion engine.

Description of the Related Art

These years, research and development for improving fuel efficiency that contributes to energy efficiency are conducted in order to enable more people to ensure easy and reliable access to sustainable and advanced energy. As a technique related to this type of device, a device has been conventionally known for reducing crank striking sound while suppressing degradation of fuel consumption performance of an internal combustion engine. For example, in the device described in JP 2016-173081 A, the crank striking sound in a predetermined frequency band is detected by using a knock sensor and a band-pass filter, the detected crank striking sound is compared with a plurality of thresholds, and a plurality of ignition maps used for ignition timing control are switched in accordance with a comparison result.

However, as in the device of JP 2016-173081 A, in a case where the characteristics of the ignition timing are stored beforehand as the plurality of maps and are switched in accordance with an occurrence of the crank striking sound, the processing load of the device necessary for controlling the ignition timing may be excessive.

SUMMARY OF THE INVENTION

An aspect of the present invention is a control apparatus for a spark ignition type of internal combustion engine, including: a sensor configured to detect a rotation speed and a load of the engine; and an electronic control unit configured to control an ignition timing of the engine based on the rotation speed and the load detected by the sensor and characteristic of a reference ignition timing determined as later one of an optimum ignition timing and a knock ignition timing which have been determined beforehand in accordance with the rotation speed and the load. The optimum ignition timing is determined beforehand so that a torque of the engine is maximized in accordance with the rotation speed and the load. The knock ignition timing is determined beforehand so that no knocking occurs when fuel of a reference octane number is supplied to the engine. The electronic control unit: calculates a first retard amount by multiplying a difference between an octane number of fuel currently supplied to the engine and the reference octane number by a predetermined retard amount; compensates the knock ignition timing to be retarded by the first retard amount; and calculates a second retard amount based on the predetermined retard amount and compensates the reference ignition timing to be retarded by the second retard amount when an operation region of the engine defined by the rotation speed and the load based on the rotation speed and the load detected by the sensor becomes either one of a predetermined load region higher in load than an optimum operation line in which a net fuel consumption rate of the engine is highest or a maximum output region in which an output of the engine is maximized.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, embodiments of the present invention will be described with reference to FIGS. 1 to 10. A control apparatus for an internal combustion engine in accordance with an embodiment of the present invention is applicable to a vehicle on which a spark ignition type of internal combustion engine is mounted. Hereinafter, in particular, description will be made with regard to an example of applying to a series hybrid electric vehicle in which a generator is actuated by a spark ignition type of internal combustion engine and an electric motor is actuated to travel by electric power that has been generated. Note that such an example is similarly applicable to a vehicle capable of switching between a driving mode actuated to travel by a generator and a driving mode actuated to travel by an internal combustion engine, and is also applicable to a gasoline vehicle that does not include the generator.

Figure 1:
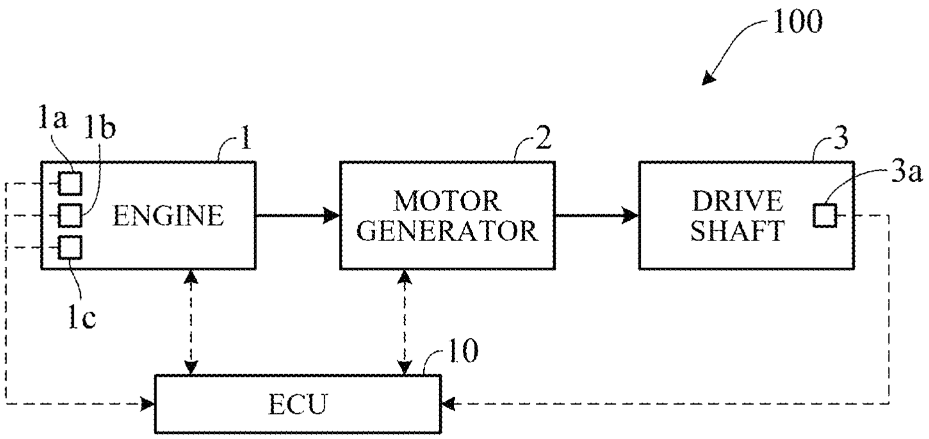
FIG. 1 is a block diagram schematically illustrating an example of an overall configuration of a control apparatus for an internal combustion engine in accordance with an embodiment of the present invention.

FIG. 1 is a block diagram schematically illustrating an example of an overall configuration of a control apparatus (hereinafter, the apparatus) 100 for an internal combustion engine in accordance with an embodiment of the present invention. As illustrated in FIG. 1, the apparatus 100 mainly includes: an engine 1, which is a spark ignition type of internal combustion engine, and which is mounted on a vehicle, not illustrated; a motor generator 2, which is connected with an output shaft of the engine 1; and an electronic control unit (ECU) 10, which controls the engine 1 and the motor generator 2. A drive shaft 3 of the vehicle is connected with an output shaft of the motor generator 2.

The engine 1 is provided with an intake air amount sensor 1*a* for detecting an intake air amount of the engine 1, a rotation speed sensor 1*b* for detecting a rotation speed (an engine speed Ne) of the engine 1, and a knock sensor 1*c* for detecting knocking by detecting vibration of a cylinder block of the engine 1. The drive shaft 3 is provided with a vehicle speed sensor 3*a* for detecting a vehicle speed V via the rotation speed of the drive shaft 3. The intake air amount sensor 1*a*, the rotation speed sensor 1*b*, the knock sensor 1*c*, and the vehicle speed sensor 3*a* are connected with the ECU 10, and signals indicating detection results by the intake air amount sensor 1*a*, the rotation speed sensor 1*b*, the knock sensor 1*c*, and the vehicle speed sensor 3*a* are input into the ECU 10.

Figure 2:
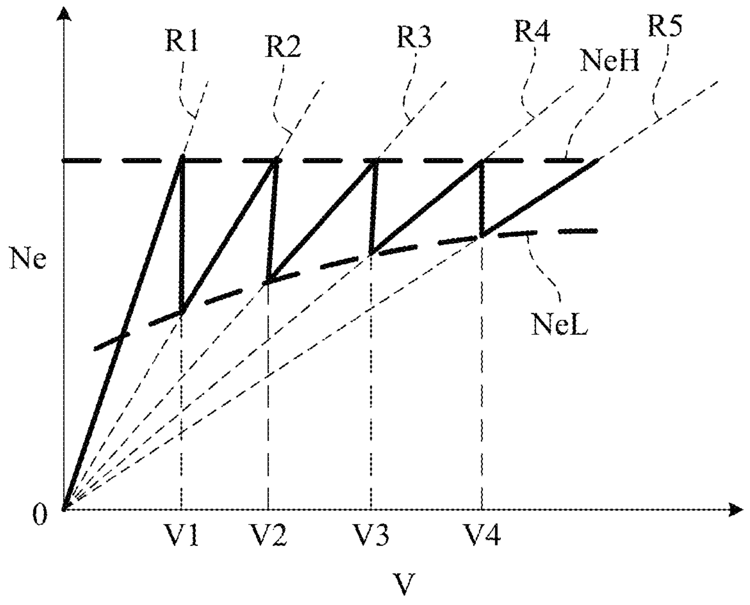
FIG. 2 is a diagram for describing pseudo variable rotation speed control by an ECU in FIG. 1 for a motor generator.

FIG. 2 is a diagram for describing pseudo variable rotation speed control by the ECU 10 for the motor generator 2. When the engine 1 is operated to increase power generation efficiency (a net fuel consumption rate) regardless of the vehicle speed V, it is possible to improve the fuel efficiency, but it may give the driver of the vehicle an odd feeling. A situation in which the engine 1 and the drive shaft 3 are connected with each other via a stepped transmission is simulated. By conducting control to increase or decrease the engine speed Ne in accordance with the vehicle speed V (the pseudo variable rotation speed control), the odd feeling given to the driver can be prevented.

The ECU 10 controls the engine speed Ne via the rotation speed of the motor generator 2. More specifically, as illustrated in FIG. 2, the engine speed Ne is increased or decreased in accordance with the vehicle speed V between a predetermined upper limit speed NeH and a predetermined lower limit speed NeL. For example, the engine speed Ne is increased or decreased in accordance with the vehicle speed V at a change rate R1 when the vehicle speed V is equal to or higher than 0 and is lower than a threshold V1, at a change rate R2 when the vehicle speed V is equal to or higher than the threshold V1 and is lower than a threshold V2, at a change rate R3 when the vehicle speed V is equal to or higher than the threshold V2 and is lower than a threshold V3, at a change rate R4 when the vehicle speed V is equal to or higher than the threshold V3 and is lower than a threshold V4, and at a change rate R5 when the vehicle speed V is equal to or higher than the threshold V4 (0<V1<V2<V3<V4, 0<R1<R2<R3<R4<R5).

Figure 3:
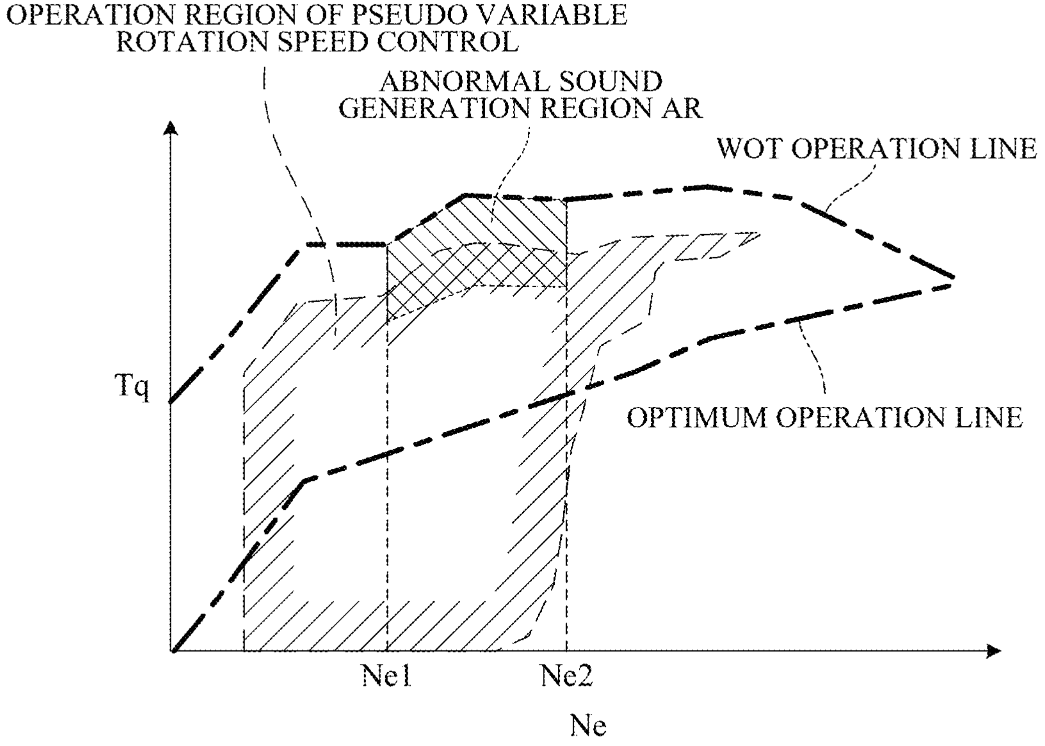
FIG. 3 is a diagram for describing an operation region of an engine in FIG. 1 when the pseudo variable rotation speed control is conducted.

FIG. 3 is a diagram for describing an operation region of the engine 1 when the pseudo variable rotation speed control is conducted. The operation region of the engine 1 is defined by a rotation speed (the engine speed Ne) of the engine 1 and a load. The load of the engine 1 can be expressed by, for example, torque Tq or filling efficiency ηc of the engine 1. The filling efficiency ηc denotes a ratio (percentage) of an intake air amount per cycle (volume in a standard state) to a cylinder volume (exhaust air amount) of the engine 1, and can be calculated, based on the intake air amount from the intake air amount sensor 1*a*. The torque Tq is proportional to the filling efficiency ηc.

As illustrated in FIG. 3, in a case where the pseudo variable rotation speed control is not conducted, the operation region along an optimum operation line with the highest net fuel consumption rate is used. On the other hand, in a case where the pseudo variable rotation speed control is conducted, the engine speed Ne is determined in accordance with the vehicle speed V (FIG. 2), and the torque Tq is determined in accordance with the engine speed Ne and the power generation amount of the motor generator 2. Therefore, a broad operation region including a high-load region near a WOT (Wide Open Throttle) operation line is used.

Figure 4:
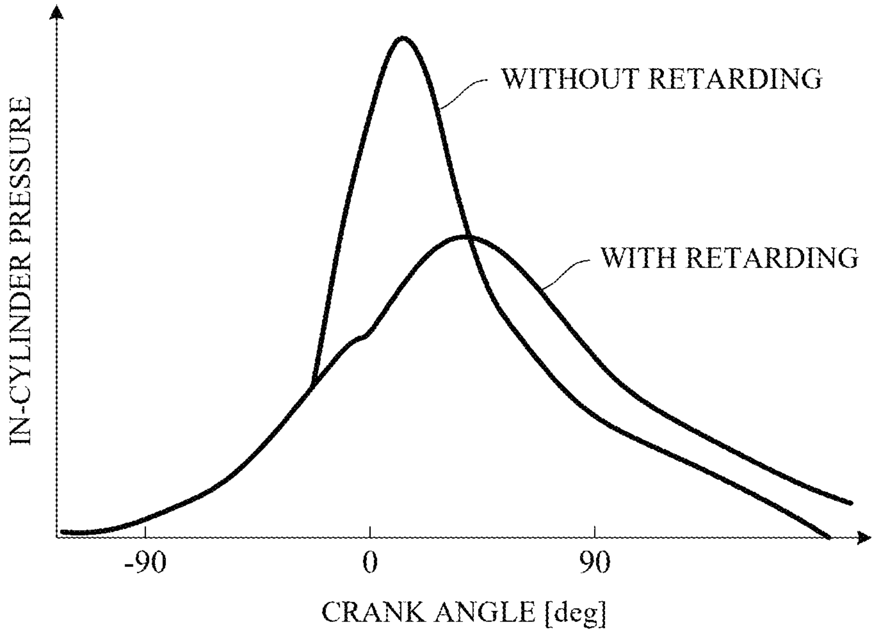
FIG. 4 is a diagram for describing in-cylinder pressure while the engine is in a high-load operation.
Figure 5:
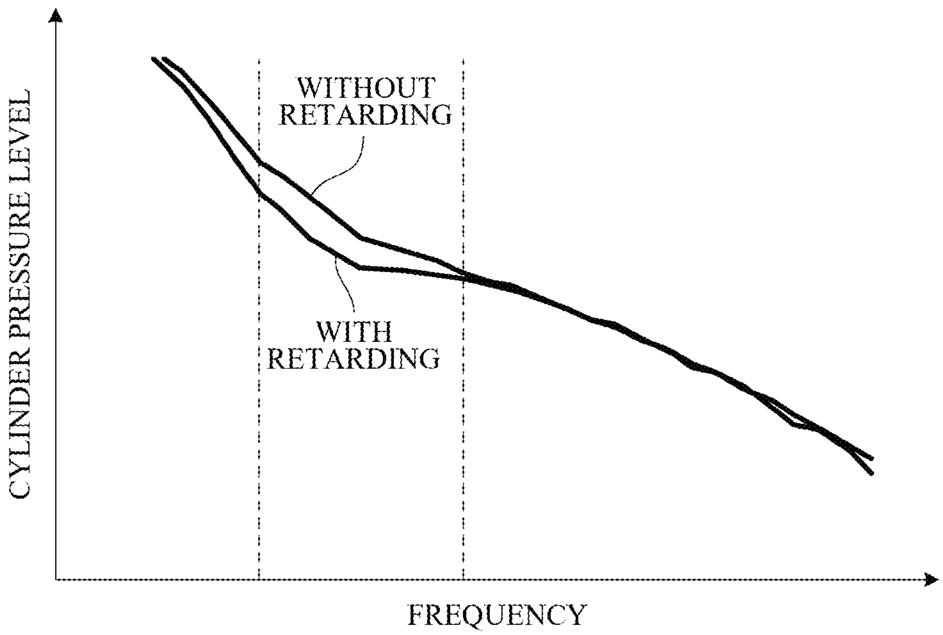
FIG. 5 is a diagram for describing cylinder pressure levels corresponding to FIG. 4.

FIG. 4 is a diagram for describing in-cylinder pressure while the engine 1 is in a high-load operation, and FIG. 5 is a diagram for describing cylinder pressure levels corresponding to FIG. 4. In a high-load region, the in-cylinder pressure (combustion pressure) of the engine 1 largely fluctuates as illustrated in FIG. 4. Thus, the cylinder pressure level as illustrated in FIG. 5 increases, and excites the vibration of the crankshaft or the like of the engine 1. In this case, in an operation region (an abnormal sound generation region AR) in which the predetermined engine speed Ne (Ne1≤Ne≤Ne2, for example, from about 1800 rpm to about 4200 rpm) illustrated in FIG. 3, the vibration of the frequency (for example, from about 200 Hz to about 770 Hz) that the occupant of the vehicle can recognize as abnormal sound may increase. The abnormal sound generation region AR is the high-load region near the WOT operation line, and is an operation region higher in load than at least the optimum operation line. Hereinafter, the abnormal sound generation region AR will be referred to as a "load region", in some cases.

In such an abnormal sound generation region AR, by retarding an ignition timing θ of the engine 1, the combustion speed is slowed, so that the fluctuation of the in-cylinder pressure can be moderated, the cylinder pressure level can be lowered, and the abnormal sound can be suppressed without limiting the torque Tq. For example, by setting different characteristics of the ignition timing θ between the abnormal sound generation region AR and the other operation regions (a characteristic map of the ignition timing θ in accordance with the engine speed Ne and the load) and switching them in accordance with a current operation region, the ignition timing θ can be retarded in the abnormal sound generation region AR.

However, depending on the number of variable speeds (five speeds in the example of FIG. 2) and the change rates R1 to R5 in the pseudo variable rotation speed control, the abnormal sound generation region AR is frequently used, and it may be necessary to frequently switch the characteristic maps of the ignition timing θ. In this case, the processing load necessary for controlling the ignition timing θ may become excessive. For this reason, in the present embodiment, the apparatus 100 is configured as follows to compensate the ignition timing θ in accordance with the operation region of the engine 1 so as to suppress the processing load necessary for controlling the ignition timing θ for suppressing the abnormal sound.

Figure 6:
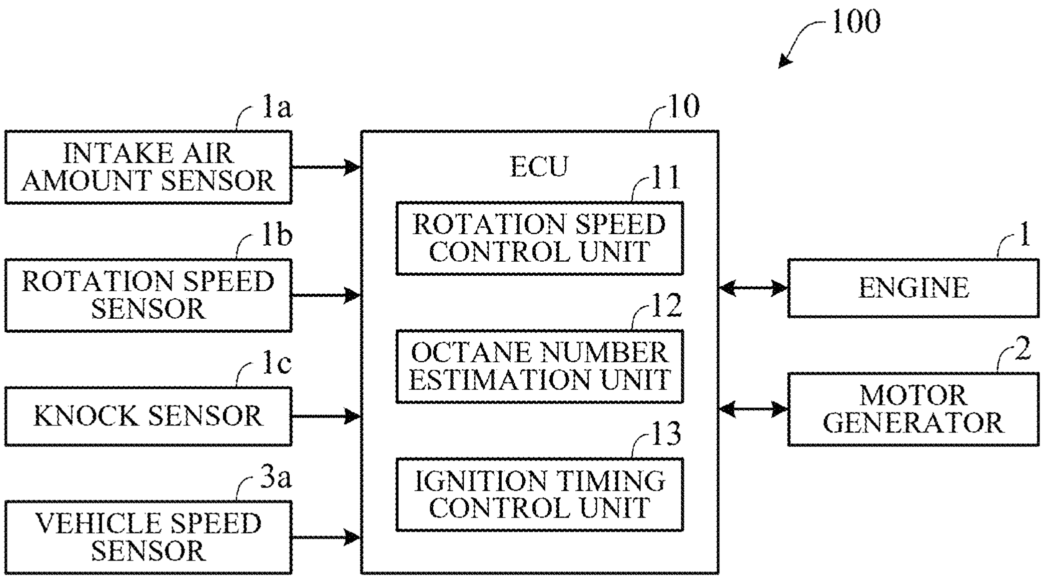
FIG. 6 is a block diagram schematically illustrating an example configuration of main components of the apparatus in FIG. 1.

FIG. 6 is a block diagram schematically illustrating an example configuration of main components of the apparatus 100. As illustrated in FIGS. 1 and 6, the apparatus 100 mainly includes the ECU 10, and the intake air amount sensor 1*a*, the rotation speed sensor 1*b*, the knock sensor 1*c*, the vehicle speed sensor 3*a*, the engine 1, and the motor generator 2 are connected with the ECU 10. The ECU 10 includes a computer including a processor such as a CPU, a memory such as a ROM and a RAM, and other peripheral circuits. The ECU 10 includes a rotation speed control unit 11, an octane number estimation unit 12, and an ignition timing control unit 13 as functional configurations, and functions as the rotation speed control unit 11, the octane number estimation unit 12, and the ignition timing control unit 13.

The rotation speed control unit 11 controls the engine speed Ne via the rotation speed of the motor generator 2, based on the vehicle speed V that has been detected by the vehicle speed sensor 3*a* and a predetermined characteristic (FIG. 2).

The octane number estimation unit 12 estimates the octane number of the fuel supplied to the engine 1. For example, when a change in the engine speed Ne and a change in the load is small, the ignition timing θ is gradually advanced, and the octane number corresponding to the ignition timing when knocking is detected by the knock sensor 1*c* is estimated to be the octane number of the fuel supplied to the engine 1. The octane number (an estimated octane number) estimated by the octane number estimation unit 12 is stored in the memory of the ECU 10. Alternatively, the octane number (a designated octane number) of the designated fuel (for example, regular gasoline, mixed fuel of ethanol and gasoline (E100, E85), and the like) designated for every vehicle may be estimated to be the octane number (the estimated octane number) of the fuel supplied to the engine 1. In this case, for example, an average octane number of commercially available designated fuel (for example, RON91 of regular gasoline) is stored as the designated octane number in the memory of the ECU 10 beforehand. Then, the octane number estimation unit 12 reads the designated octane number stored in the memory of the ECU 10, and estimates such a value to be the octane number (the estimated octane number) of the fuel supplied to the engine 1.

Figure 7:
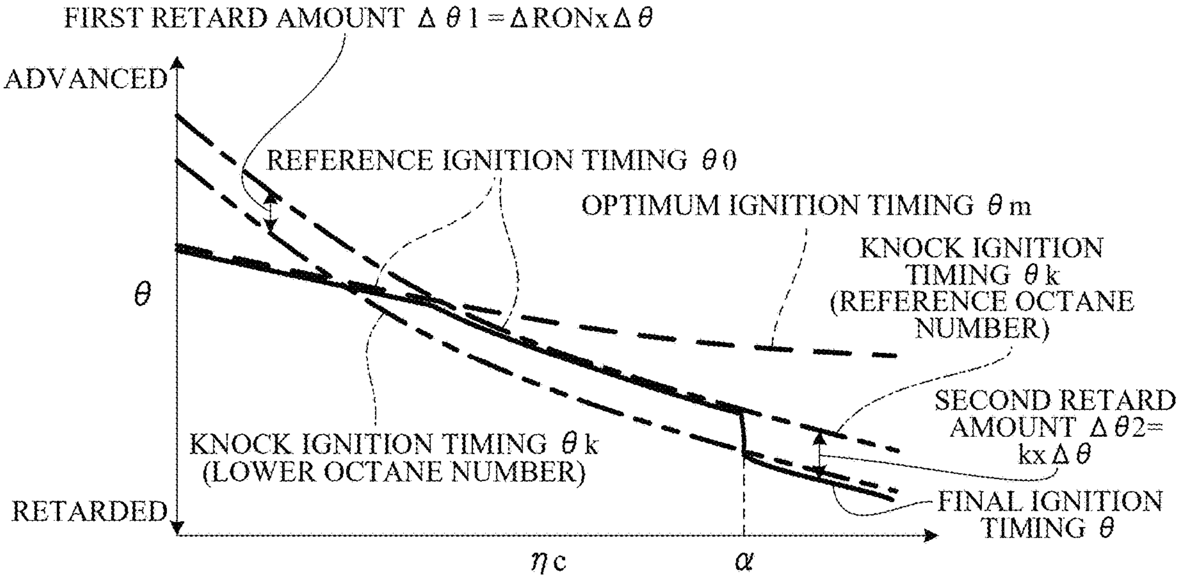
FIG. 7 is a diagram for describing ignition timing set by an ignition timing control unit in FIG. 6.
Figure 8:
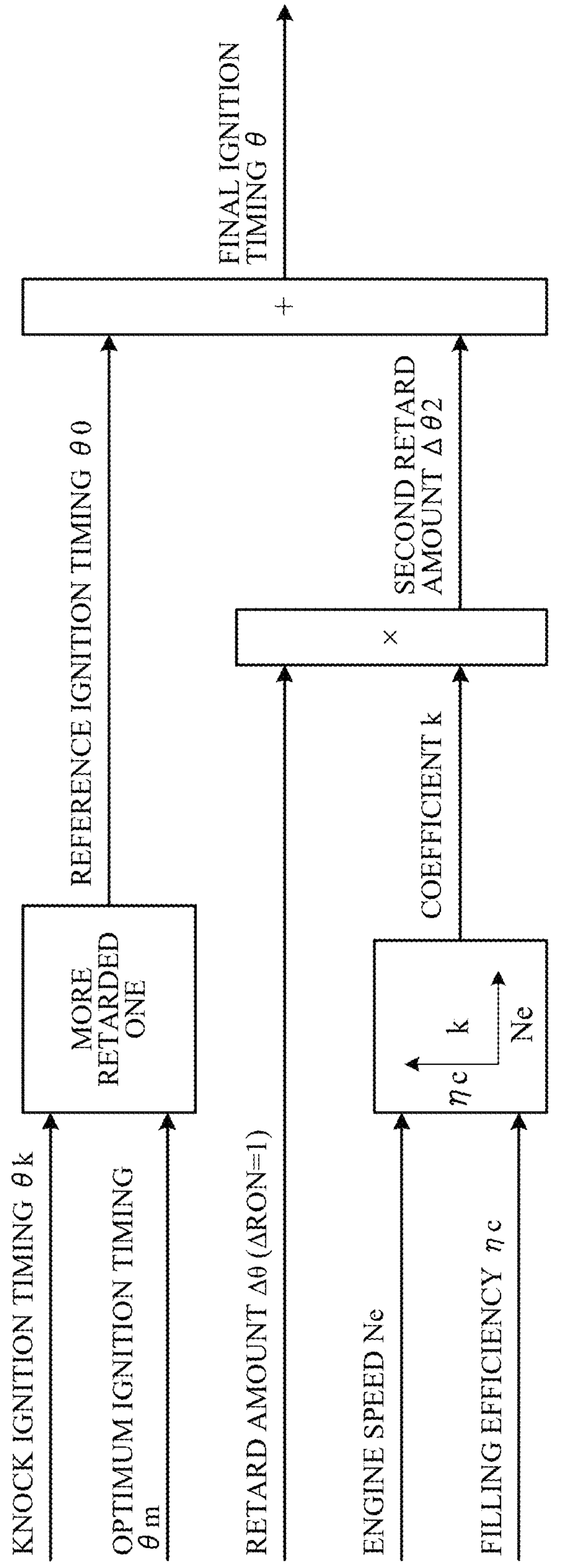
FIG. 8 is a diagram for describing settings of the ignition timing by the ignition timing control unit.

FIG. 7 is a diagram for describing the ignition timing θ of the engine 1 set by the ignition timing control unit 13, and illustrates an example of the characteristics of the ignition timing θ corresponding to the filling efficiency ηc at a specific engine speed Ne ($Ne1 \leq Ne \leq Ne2$). In addition, FIG. 8 is a diagram for describing settings of the ignition timing θ by the ignition timing control unit 13.

The characteristics of an optimum ignition timing θm when the torque Tq of the engine 1 is maximized are determined beforehand in accordance with the engine speed Ne and the filling efficiency ηc in a combustion test, and are stored as a characteristic map in the memory of the ECU 10. Further, the characteristics of a knock ignition timing θk on the most advanced angle side where no knocking occurs, are also determined beforehand in accordance with the engine speed Ne and the filling efficiency ηc in the combustion test, and are stored as a characteristic map in the memory of the ECU 10. As illustrated in FIGS. 7 and 8, an ignition timing on a more retarded angle side out of the optimum ignition timing θm and the knock ignition timing θk is set as a reference ignition timing θ0 when the torque Tq is maximized within a range in which no knocking occurs.

The characteristics of the optimum ignition timing θm and the knock ignition timing θk are determined by supplying fuel of a reference octane number to the engine 1 and carrying out the combustion test. The reference octane number denotes an octane number of reference fuel (for example, high-octane gasoline), and for example, an average octane number of commercially available reference fuel (for example, RON95 of high-octane gasoline) is stored as the reference octane number in the memory of the ECU 10. The optimum ignition timing θm becomes a constant ignition timing regardless of the octane number. On the other hand, knocking occurs more easily as the octane number of the fuel is lower, and thus the knock ignition timing θk shifts to a retarded angle side as the octane number decreases.

The ignition timing control unit 13 subtracts the reference octane number from the estimated octane number to calculate a difference ΔRON between the estimated octane number and the reference octane number. Then, in a case where the estimated octane number is lower than the reference octane number (ΔRON<0), a first retard amount Δθ1, which is obtained by multiplying the predetermined retard amount Δθ by the difference ΔRON, is calculated ($\Delta\theta1 = \Delta RON \times \Delta\theta$), and the knock ignition timing θk is compensated to be retarded by the first retard amount Δθ1. In this manner, in a case where the octane number (the estimated octane number) of the fuel supplied to the engine 1 is lower than the reference octane number and the knocking easily occurs, the ignition timing can be adjusted to fall within a range in which no knocking occurs by compensating the knock ignition timing θk to be retarded. The predetermined retard amount Δθ denotes a retard amount when the difference ΔRON between the estimated octane number and the reference octane number is "1", is determined beforehand in the combustion test, and is stored in the memory of the ECU 10.

The ignition timing control unit 13 calculates the filling efficiency ηc, based on the intake air amount that has been detected by the intake air amount sensor 1*a*. Then, the ignition timing control unit 13 refers to the characteristics of the optimum ignition timing θm and the knock ignition timing θk, and determines the reference ignition timing θ0 corresponding to the engine speed Ne and the filling efficiency ηc (load). That is, the optimum ignition timing θm is set as the reference ignition timing θ0 in a low-load region, and the knock ignition timing θk is set as the reference ignition timing θ0 in a high-load region.

The ignition timing control unit 13 compensates the reference ignition timing θ0 to be retarded, when reaching a predetermined abnormal sound generation region AR in which the engine speed Ne is equal to or higher than a first rotation speed Ne1 and is equal to or lower than the second rotation speed Ne2 and the filling efficiency ηc is equal to or larger than a predetermined value α. More specifically, a second retard amount Δθ2 is calculated by multiplying the predetermined retard amount Δθ by a predetermined coefficient k ($\Delta\theta2 = k \times \Delta\theta$), and the reference ignition timing θ0 is compensated to be retarded by the second retard amount Δθ2. In this manner, in the abnormal sound generation region AR, by compensating the reference ignition timing θ0 to be retarded, the combustion speed is slowed, so that the fluctuation of the in-cylinder pressure can be moderated, the cylinder pressure level can be lowered, and the abnormal sound can be suppressed.

Also in a maximum output region of the high rotation and high load where the output of the engine 1 is maximized (near the maximum rotation and near the WOT), the ignition timing control unit 13 may compensate the reference ignition timing θ0 to be retarded similarly to the abnormal sound generation region AR. In the maximum output region, the fluctuation of the in-cylinder pressure (FIG. 4) and the cylinder pressure level (FIG. 5) of the engine 1 are larger than those in the abnormal sound generation region AR, and the combustion sound itself becomes larger. Hence, the occupant of the vehicle may recognize the combustion sound as the abnormal sound. Also in such a maximum output region, similarly to the abnormal sound generation region AR, the second retard amount Δθ2 is calculated by multiplying the predetermined retard amount Δθ by the predetermined coefficient k ($\Delta\theta2 = k \times \Delta\theta$), and the reference ignition timing θ0 is compensated to be retarded by the second retard amount Δθ2. Also in the maximum output region, by compensating the reference ignition timing θ0 to be retarded, the combustion speed is slowed, so that the fluctuation of the in-cylinder pressure can be moderated, the cylinder pressure level can be lowered, and the abnormal sound can be suppressed.

In this manner, by conducting the retard control of the ignition timing θ with compensation instead of the switching the characteristic maps, it becomes possible to suppress the processing load, and to conduct timely retard control reliably even though the abnormal sound generation region AR is frequently used by the pseudo variable rotation speed control. In addition, by calculating the second retard amount Δθ2 of the reference ignition timing θ0 for suppressing the abnormal sound using the predetermined retard amount Δθ, which is common to the first retard amount Δθ1 at the knock ignition timing θk in accordance with the octane number of the fuel, it becomes possible to further suppress the processing load necessary for controlling the ignition timing θ. That is, by similarly performing the retard compensation for adjusting the ignition timing in the range in which no knocking occurs and the retard compensation for suppressing the abnormal sound using the common predetermined retard amount Δθ, it becomes possible to further suppress the processing load necessary for controlling the ignition timing θ.

Figure 9:
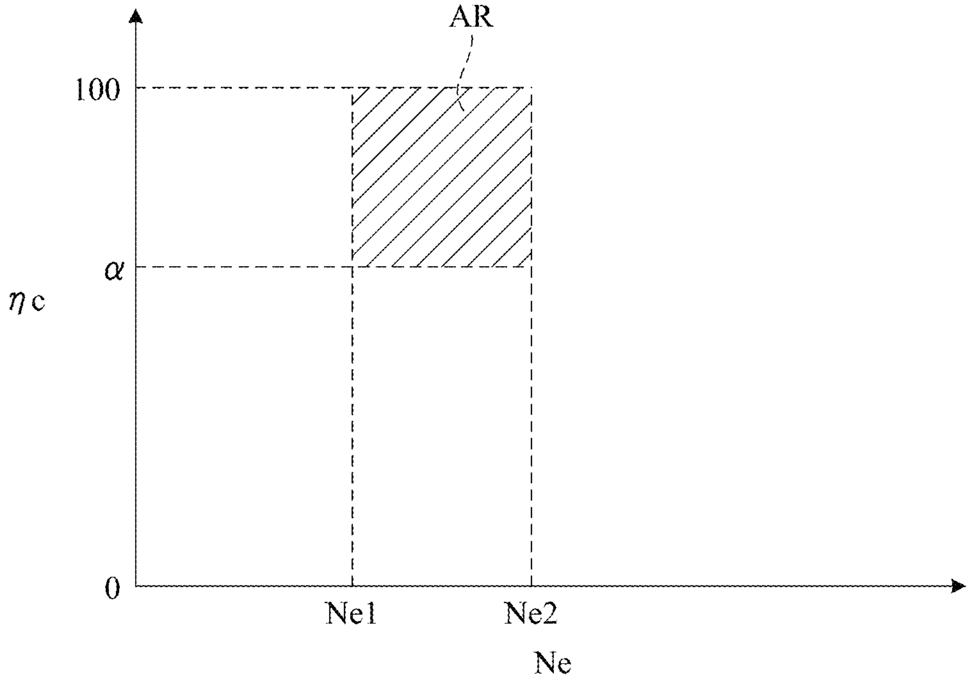
FIG. 9 is a diagram for describing characteristics of a coefficient in FIG. 8.

FIG. 9 is a diagram for describing characteristics of the coefficient k. The characteristics of the coefficient k are determined beforehand in accordance with the engine speed Ne and the filling efficiency ηc in the combustion test, and are stored as a characteristic map in the memory of the ECU 10. As illustrated in FIG. 9, the coefficient k is determined as a value (for example, a natural number) larger than "0" in the abnormal sound generation region AR (Ne1≤Ne≤Ne2 and α≤ηc≤100), and is determined as "0" outside the abnormal sound generation region AR (Ne<Ne1 or Ne>Ne2 or ηc<α). The coefficient k may be determined as a constant value in the abnormal sound generation region AR, or may be determined as a value that changes in accordance with the engine speed Ne or the filling efficiency ηc. The coefficient k may be determined in accordance with the octane number of the fuel supplied to the engine 1, in addition to the engine speed Ne and the filling efficiency ηc.

Although the illustration is omitted, in a case where the reference ignition timing θ0 is compensated to be retarded for suppressing the abnormal sound also in the maximum output region, the coefficient k is set to a value larger than "0" also in the maximum output region, in addition to the abnormal sound generation region AR. The coefficient k of the maximum output region may be determined as an identical value to that in the abnormal sound generation region AR, or may be determined as a different value. The coefficient k of the maximum output region may also be determined in accordance with the octane number of the fuel supplied to the engine 1, in addition to the engine speed Ne and the filling efficiency ηc.

The filling efficiency ηc of the engine 1 has a correlation with the in-cylinder pressure of the engine 1, and has a correlation with the cylinder pressure level that excites vibration leading to the abnormal sound. By determining the characteristics of the coefficient k in accordance with such filling efficiency ηc, it becomes possible to accurately calculate an appropriate second retard amount Δθ2 for suppressing the abnormal sound.

Figure 10:
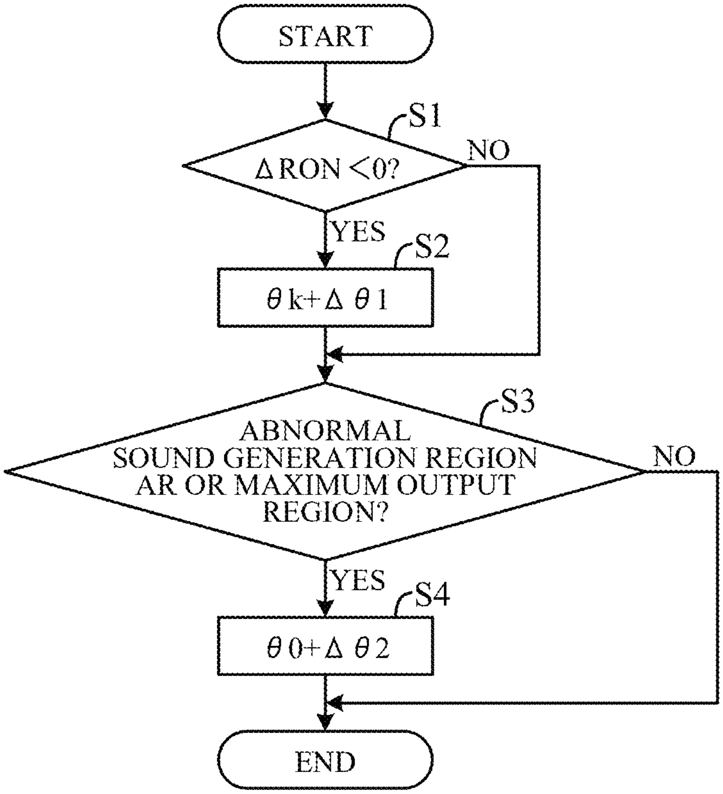
FIG. 10 is a flowchart illustrating an example of processing performed by the ECU in FIG. 6.

FIG. 10 is a flowchart illustrating an example of processing performed by the ECU 10. The processing illustrated in this flowchart is started, when the vehicle is activated and the ECU 10 is activated, and is repeated at every predetermined time interval.

As illustrated in FIG. 10, first, in S1 (S: processing step), the difference ΔRON between the estimated octane number and the reference octane number is calculated, and whether the difference ΔRON is smaller than "0" is determined. In a case where a positive determination is made in S1, it is determined that the estimated octane number is lower than the reference octane number, and the processing proceeds to S2. In a case where a negative determination is made in S1, it is determined that the estimated octane number is not lower than the reference octane number, and the processing proceeds to S3. In S2, the first retard amount Δθ1 is calculated by multiplying the predetermined retard amount Δθ by the difference ΔRON, and the knock ignition timing θk is compensated to be retarded by the first retard amount Δθ1.

In S3, whether the current operation region corresponding to the engine speed Ne and the filling efficiency ηc (load) falls within the abnormal sound generation region AR or falls within the maximum output region is determined. In a case where a positive determination is made in S3, the processing proceeds to S4, and in a case where a negative determination is made in S3, the processing ends. In S4, the second retard amount Δθ2 is calculated by multiplying the predetermined retard amount Δθ by the coefficient k corresponding to the current engine speed Ne and the filling efficiency ηc (load), and the reference ignition timing θ0 is compensated to be retarded by the second retard amount Δθ2.

According to the embodiments of the present invention, the following operation and effect are achievable.

(1) The apparatus 100 includes: the engine 1, which is a spark ignition type of internal combustion engine; the sensors (the intake air amount sensor 1*a* and the rotation speed sensor 1*b*), which detect a rotation speed (the engine speed Ne) and a load (the torque Tq and the filling efficiency ηc) of the engine 1; and the ignition timing control unit 13, which controls the ignition timing θ of the engine 1, based on the rotation speed and the load that have been detected by the sensors and a characteristic of a reference ignition timing θ0 determined as later one of the optimum ignition timing θm and the knock ignition timing θk, which have been determined beforehand in accordance with the rotation speed and the load (FIGS. 1, 6, and 7). The optimum ignition timing θm is determined beforehand so that the torque Tq is maximized in accordance with the rotation speed and the load. The knock ignition timing θk is determined beforehand so that no knocking occurs when a fuel of a reference octane number is supplied to the engine 1.

The ignition timing control unit 13 calculates the first retard amount Δθ1, which is obtained by multiplying the difference ΔRON between the octane number (the estimated octane number) of the fuel supplied to the engine 1 and the reference octane number by a predetermined retard amount Δθ, and compensates the knock ignition timing θk to be retarded by the first retard amount Δθ1 (S1 to S2 in FIGS. 7 and 10). In addition, when the operation region of the engine 1 defined by the rotation speed and the load based on the rotation speed and the load that have been detected by the sensors becomes either one of a predetermined load region (the abnormal sound generation region AR) higher in load than the optimum operation line in which the net fuel consumption rate of the engine 1 is the highest or a maximum output region in which the output of the engine 1 is maximized, the ignition timing control unit 13 calculates the second retard amount Δθ2, based on the predetermined retard amount Δθ, and compensates the reference ignition timing θ0 to be retarded by the second retard amount Δθ2 (S3 to S4 in FIGS. 7 to 9 and 10).

This enables the reference ignition timing θ0 to be retarded in the abnormal sound generation region AR and the maximum output region without switching the characteristic maps, so that the processing load of the apparatus 100 necessary for controlling the ignition timing θ can be suppressed. Further, by performing the retard compensation using the common predetermined retard amount Δθ for the adjustment (entire region) of the knock ignition timing θk in accordance with the octane number of the fuel and the adjustment (the abnormal sound generation region AR, the maximum output region) of the reference ignition timing θ0 for suppressing the abnormal sound, the processing load necessary for controlling the ignition timing θ can be further suppressed. That is, the control of the retard compensation for the knock ignition timing θk to be conducted, when the fuel of an octane number lower than that of the reference fuel corresponding to the predetermined knock ignition timing θk is supplied, is also applied to the retard compensation for the reference ignition timing θ0 to suppress the abnormal sound. This eliminates the need for separately providing the control for suppressing the abnormal sound, and simplifies the entire control of the ignition timing θ, so that the processing load necessary for controlling the ignition timing θ can be further suppressed.

(2) The ignition timing control unit 13 calculates the second retard amount 402 by multiplying the predetermined retard amount Δθ by the predetermined coefficient k (FIG. 8).

(3) The apparatus 100 further includes: the motor generator 2, which is connected with the engine 1; and the rotation speed control unit 11, which controls the rotation speed of the engine 1 via the rotation speed of the motor generator 2 (FIG. 6). In controlling the rotation speed of the engine 1 via the rotation speed of the motor generator 2, the torque Tq is determined in accordance with the engine speed Ne and the power generation amount of the motor generator 2, so that a broad operation region including a high-load region can be used. In the high-load region, the fluctuation of the in-cylinder pressure increases, and thus the in-cylinder pressure level increases, and excites the vibration of the crankshaft or the like of the engine 1. Hence, abnormal sound may occur. By determining beforehand the abnormal sound generation region AR in which such abnormal sound may occur, and compensating the reference ignition timing θ0 to be retarded in the abnormal sound generation region AR, so that the abnormal sound can be suppressed while the processing load is being suppressed.

(4) The rotation speed control unit 11 increases or decreases the engine speed Ne at a plurality of different change rates R1 to R5 in accordance with the traveling speed (the vehicle speed V) of the vehicle actuated to travel by the motor generator 2 (FIG. 2). In a case where such pseudo variable rotation speed control is conducted, the abnormal sound generation region AR is frequently used depending on the number of variable speeds and the change rates R1 to R5. Hence, in a case where the retard control of the ignition timing θ is conducted by switching the characteristic maps, the processing load may be excessive, and timely retard control may be difficult. By conducting the retard control of the ignition timing θ by compensation instead of switching the characteristic maps, the processing load can be suppressed, and the timely retard control can be conducted reliably even when the abnormal sound generation region AR is frequently used in the pseudo variable rotation speed control.

The above embodiments can be modified into various manners. Hereinafter, modifications will be described. In the above embodiment, an example has been described in which the filling efficiency ηc is calculated, based on the intake air amount that has been detected by the intake air amount sensor 1*a*, and is used as a physical amount representing the load of the engine 1. However, the sensor for detecting the load of the spark ignition type of internal combustion engine is not limited to such a sensor. For example, a sensor for detecting the torque Tq as the load of the engine 1 may be used. In the above embodiment, the predetermined value α is given as an example of a constant that does not depend on the engine speed Ne in FIG. 9 and the like. However, the predetermined value a may be determined to change in accordance with the engine speed Ne.

The above embodiment can be combined as desired with one or more of the aforesaid modifications. The modifications can also be combined with one another.

According to the present invention, it becomes possible to suppress the processing load necessary for controlling the ignition timing.

Above, while the present invention has been described with reference to the preferred embodiments thereof, it will be understood, by those skilled in the art, that various changes and modifications may be made thereto without departing from the scope of the appended claims.

The invention claimed is:

1. A control apparatus for a spark ignition type of internal combustion engine, comprising:
- a sensor configured to detect a rotation speed and a load of the engine; and
- an electronic control unit configured to control an ignition timing of the engine based on the rotation speed and the load detected by the sensor and characteristic of a reference ignition timing determined as later one of an optimum ignition timing and a knock ignition timing which have been determined beforehand in accordance with the rotation speed and the load, wherein
- the optimum ignition timing is determined beforehand so that a torque of the engine is maximized in accordance with the rotation speed and the load, wherein
- the knock ignition timing is determined beforehand so that no knocking occurs when fuel of a reference octane number is supplied to the engine, wherein
- the electronic control unit:
  - calculates a first retard amount by multiplying a difference between an octane number of fuel currently supplied to the engine and the reference octane number by a predetermined retard amount;
  - compensates the knock ignition timing to be retarded by the first retard amount; and
  - calculates a second retard amount based on the predetermined retard amount and compensates the reference ignition timing to be retarded by the second retard amount when an operation region of the engine defined by the rotation speed and the load based on the rotation speed and the load detected by the sensor becomes either one of a predetermined load region higher in load than an optimum operation line in which a net fuel consumption rate of the engine is highest or a maximum output region in which an output of the engine is maximized.

2. The control apparatus according to claim 1, wherein
- the electronic control unit calculates the second retard amount by multiplying the predetermined retard amount by a predetermined coefficient.

3. The control apparatus according to claim 1, further comprising:
- a motor generator connected with the engine, wherein
- the electronic control unit controls the rotation speed of the engine through a rotation speed of the motor generator.

4. The control apparatus according to claim 3, wherein the electronic control unit increases or decreases the rotation speed of the engine at a plurality of different change rates in accordance with a traveling speed of a vehicle actuated to travel by the motor generator.

5. The control apparatus according to claim 4, wherein the vehicle is a series hybrid electric vehicle in which the motor generator is actuated by the engine and an electric motor is actuated to travel by electric power generated by the motor generator.

* * * * *